This invention relates to a lifting beam for use in lifting and handling rectangular freight containers of the type shown in detail in copending application for United States Letters Patent Serial No. 828,330 filed July 20, 1959 now Patent No. 3,034,825 by Leslie A. Harlander and Roy K. Walther.

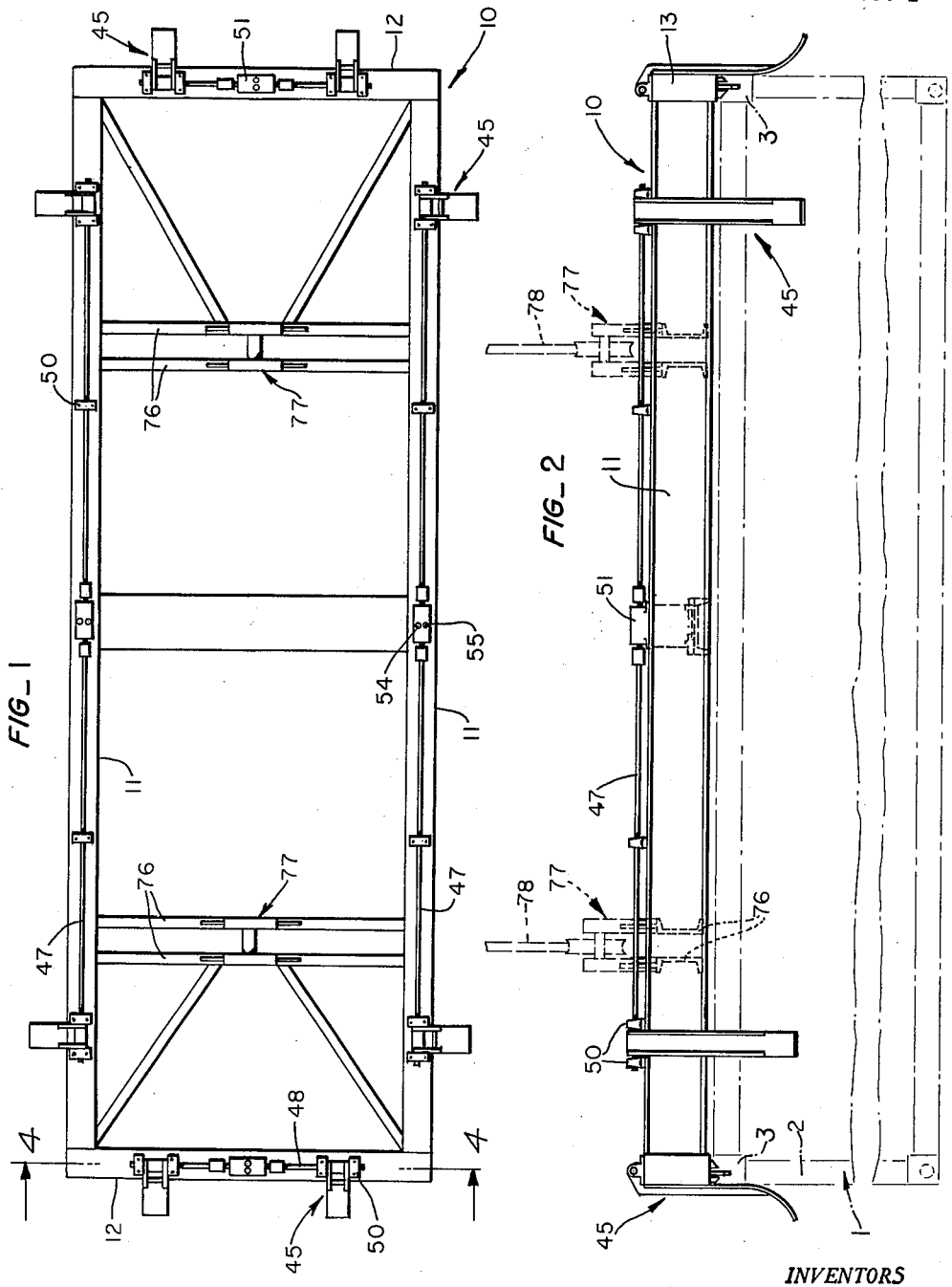

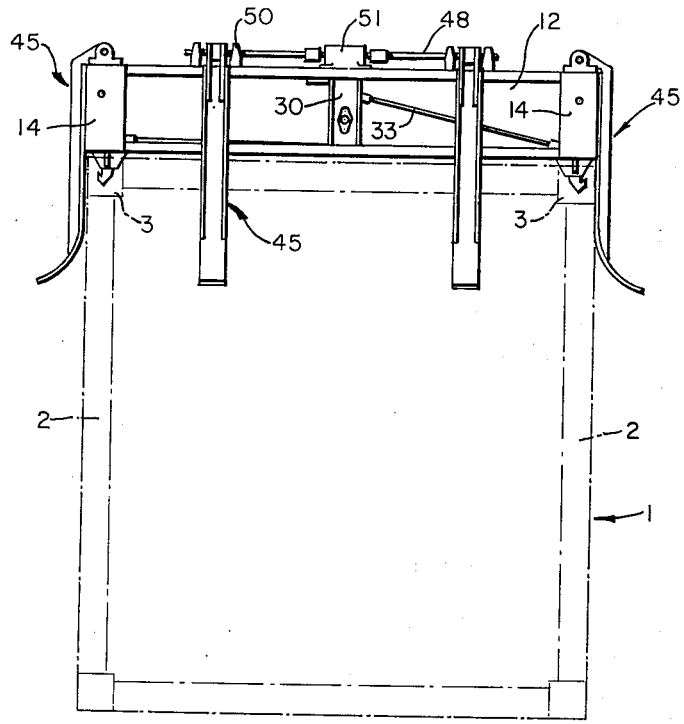
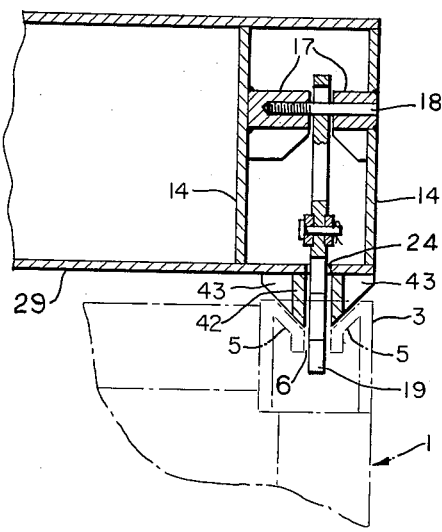

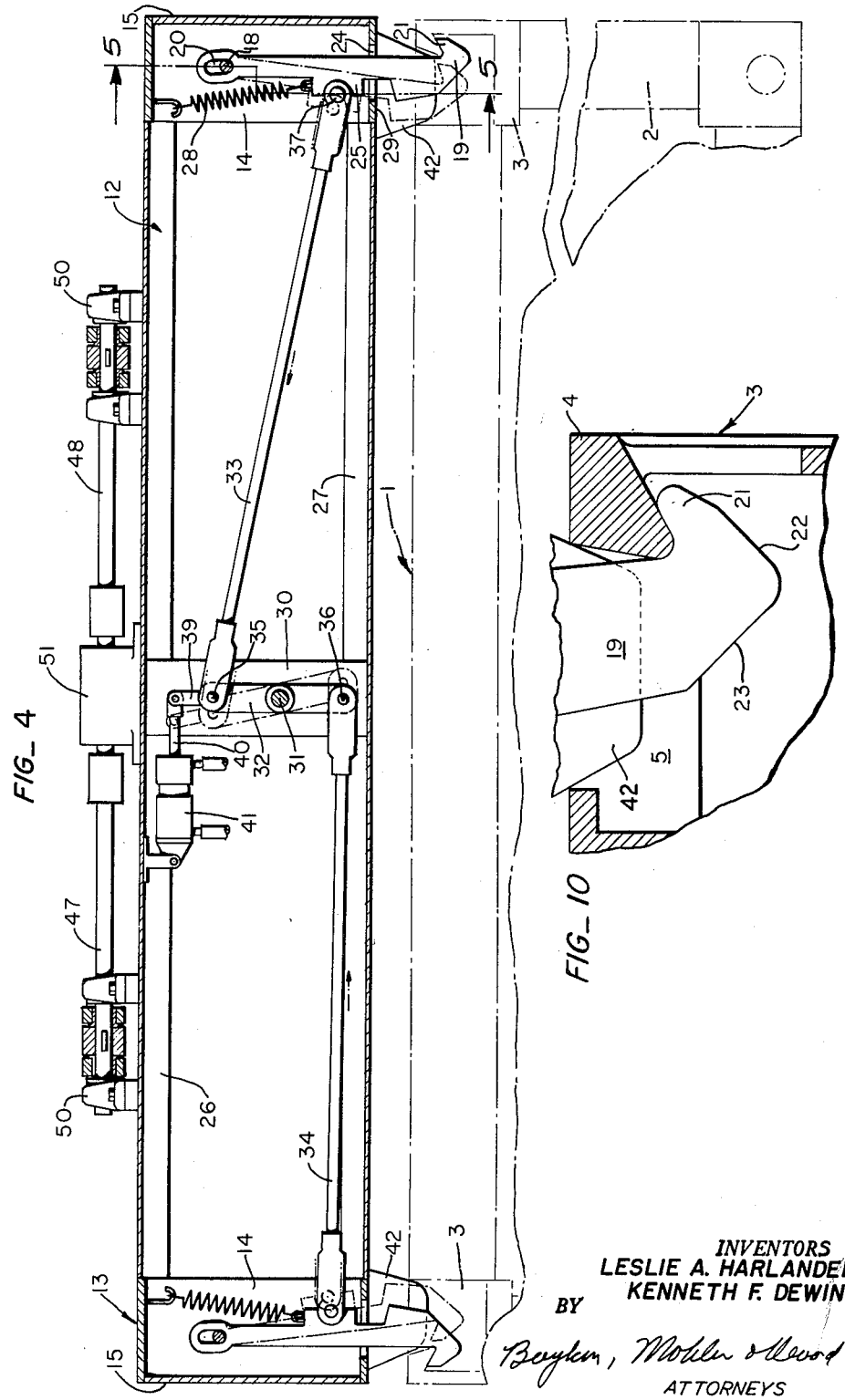

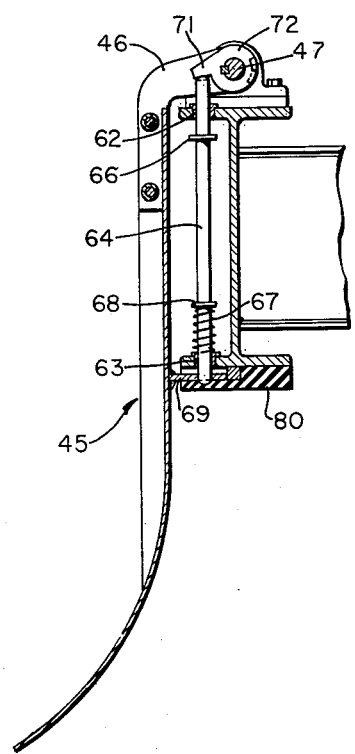
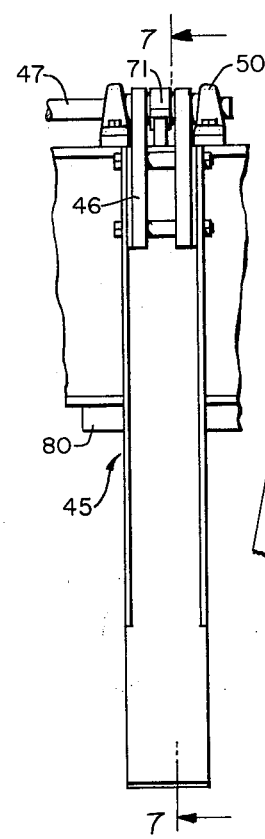
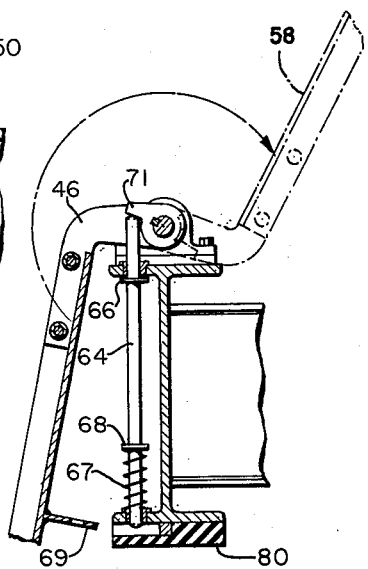
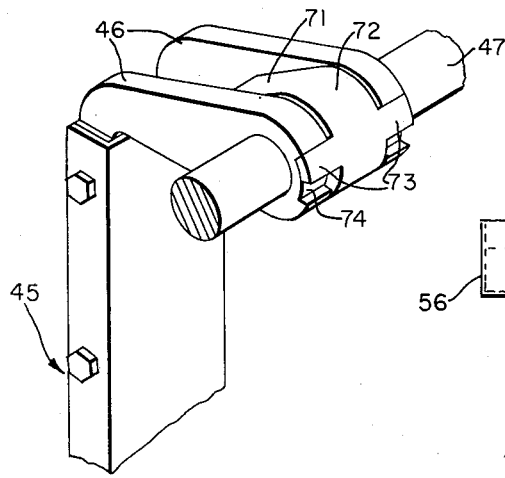
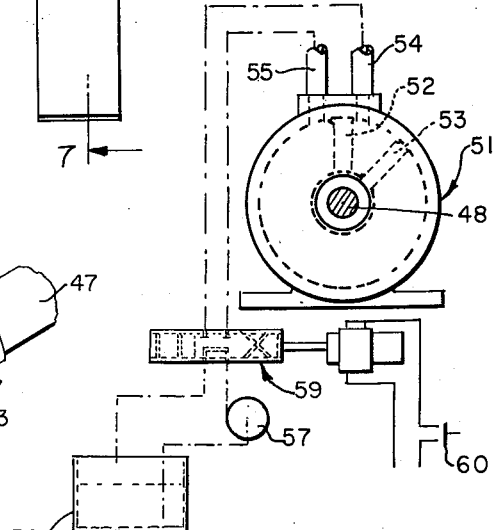
INVENTORS
LESLIE A. HARLANDER
KENNETH F. DEWING
BY
*Boykin, Mohler & Wood*
ATTORNEYS 3,078,115
LIFTING BEAM
Leslie A. Harlander and Kenneth F. Dewing, Orinda, Calif., assignors to Matson Navigation Company, San Francisco, Calif.
Filed Aug. 31, 1959, Ser. No. 837,002
11 Claims. (Cl. 294—67)

Containers of this type have been developed for holding articles for shipment. They are relatively large and may constitute the load containing body of a vehicle, such as a truck or tractor drawn freight trailer. The container is adapted to be releasably secured onto the chassis of such trailer, and to be released the efrom and hoisted directly therefrom for deposit thereof onto the ground or a loading platform, or onto a ship or other vehicle or wherever desired, for storage or for further transport. Thus the container may be handled several times before it reaches its ultimate destination where its contents are removed.

One of the objects of this invention is the provision of a lifting beam that is adapted to be employed in the various manipulations of a container of the above type, and which beam enables the safe, quick, efficient handling of such container in hoisting it from a vehicle, platform, or wherever it may be positioned and carrying it to an unloading point and releasing it at such point without having the beam interfere with other objects or containers that may be alongside such point.

Such manipulations require fast and automatic guidance of the beam and its container-coupling elements into coupling relation to a container, since the container to be lifted and carried to another point for release, is substantially higher than a person and is out reach of any manual control.

One of the objects of the invention is the provision of means adapted to automatically adjust or guide the lifting beam to coupling relation from a position in which it may be misaligned or out of register with the container to be lifted, and a still further object of the invention is the provision of such guide means that is movable relative to the coupling means for movement, after a coupling has been effected, to a position where it will not interfere with stowing the container against a wall or other container or containers.

A still further object of the invention is the provision of an improved arrangement of the coupling means on the lifting beam in the form of hooks that depend from the lowermost side of the lifting beam so that the rigid beam itself will not interfere with a coupling operation.

A still further object is the combination of a lifting beam and means on the container for engagement therewith whereby a quick, positive and secure coupling of the beam to the container may be effected irrespective of how tightly the containers may be stored together.

In explanation of the above, in connecting the beam to containers that may be packed closely together, it is obvious that the beam would be inoperative for being coupled to such containers if rigid portions on the beam were to project below the means that couples the beam to each container and outside the plan area of the container, since there would be no room between the containers for such rigid portions.

The efficient guidance of the beam to coupling relation with containers that may be tightly stored together also creates a problem that is different from that where a single isolated container is to be lifted, or where the containers are spaced apart a substantial distance, and it is one of the objects of this invention to provide efficient means on the beam for guiding the container-connecting means on the beam to coupling relation with the container.

Other objects and advantages will appear in the description and in the drawings.

In the drawings, FIG. 1 is a top plan view of the lifting beam.

FIG. 2 is a side elevation view of the beam of FIG. 1, the dash-dot lines indicating conventional hoisting cables that are to be attached to the lifting beam when it is in use.

FIG. 3 is an end elevational view of the beam of FIG. 1 the dash-dot lines indicating an end of the container to be coupled to the beam.

FIG. 4 is an enlarged sectional view taken along line 4—4 of FIG. 1 with the container, partly broken away, being indicated below the beam in dot-dash lines.

FIG. 5 is an enlarged sectional view taken along line 5—5 of FIG. 4 with part of the container to be lifted indicated in dot-dash line.

FIG. 6 is a fragmentary side elevation view of one of the guide mmebers on the lifting beam.

FIG. 7 is a sectional view taken along line 7—7 of FIG. 6.

FIG. 8 is a sectional view of the guide member of FIG. 7 in partially released position in which the lock has been actuated to release said member.

FIG. 9 is a fragmentary enlarged isometric view of one of the shafts on which one of the guide members of FIG. 6 is mounted illustrating the means for releasing the locking mechanism.

FIG. 10 is an enlarged part sectional part elevational view of one of the hooks on the lifting beam in one of the upwardly opening socket members on a corner post.

FIG. 11 is a diagrammatic view of an hydraulic torque actuator system in combination with a solenoid actuated reversing valve such as indicated generally in FIG. 1.

In detail, a container adapted to be lifted by the lifting beam is indicated in dot-dash lines in FIGS. 2, 3 and is generally designated 1. This container is horizontally elongated and has four corner posts 2 each having an upwardly opening corner casting or socket member 3 (FIGS. 2, 3, 5, 10) integrally connected therewith.

The upwardly directed opening in each socket member is relatively large at the upper end of each member, and one side of said opening is defined by a relatively thick cross bar 4 (FIG. 10) that is cast with the socket member as a part thereof. Two of the other sides of the upper portion of said socket member are walls 5 (FIG. 5) that are offset to one side of bar 4 and that extend slantingly downwardly from the ends of the bar to their lower edges which define the opposite sides of a horizontally elongated slot 6 through which a hook 19 on the lifting beam is adapted to be guided by walls 5 to a position below the bar 4, as will later be explained more in detail.

These upper socket members are almost flush at their upper sides with the top of the container 1, and are rectangular with the bars 4 extending longitudinally of the container 1 and positioned outermost at the corners relative to the longitudinal medial line or axis of the container.

The lifting beam, generally designated 10, comprises parallel, elongated, horizontal side frame members 11 and end members 12 connecting the ends of said members 11. These side frame members may be I beams, while the end frame members may each be a pair of parallel vertically spaced, opposedly opening channel strips (FIG. 4).

At each of the corners of the frame a box generally designated 13 is formed by plates 14 (FIGS. 4, 5) welded or otherwise suitably secured across the ends of the I beams and between the channels and across the ends of the channels, the web of the I beams being cut away at its ends subtsantially the width of web of the channels. A plate 15 (FIG. 4) may close the third side of each box, that extends between the flanges of each I beam outwardly of the ends of the channels.

Aligned bearings 17 spaced apart and secured to plates 14 (FIG. 5) and projecting toward each other carry a pivot 18 that may be threaded into the innermost bearings 17. These pivots are horizontal and extend longitudinally of the frame.

Within each box 13 and carried on each pivot 18 between the adjacent ends of bearings 17 is a hook generally designated 19. The upper end of the hook is formed with a vertically elongated horizontally directed opening 20 through which each pivot 18 extends (FIG. 4).

The lower end of the hook projects below the box and below the lowermost side of the beam 10, and the bills 21 of these hooks are directed outwardly and upwardly relative to the length of the frame so that they will engage below the bars 4 upon the hooks being swung laterally outwardly when the bills 21 are at a level below that of bars 4.

Each hook is flat sided and its lower edges taper convergently downwardly, one of the tapered edges 22 (FIG. 10) being below the bill 21 and the other extending downwardly from the edge of the hook opposite to the bill as at 23. The bottom plate 29 (FIG. 4) of the box 13 is formed with an opening 24 through which the hook extends and which opening is sufficiently long transversely of the length of the lifting beam to permit full swing of each hook about its pivot 18 to enable the hook to swing to and from bar engaging position.

The rear side or edge of each hook that is opposite to the bill 21 is provided with a rearward projection 25 at a point intermediate the ends of the hook and between the upper and lower channel members 26, 27 that form each of the ends of the beam.

A tension helical spring 28 is connected at one end with the said projection on each hook, and at its opposite ends with the upper plate of each box 13. These springs 28 extend substantially vertically, hence function to yieldably hold the hooks in an elevated position in which the pivots 18 engage the lower ends of the vertically elongated openings 20 formed in the upper ends of the hooks. When the lifting beam is raised and the weight of the container is applied to hooks 19 they move vertically downwardly in relation to the lifting beam to a depressed position so that pivots 18 engage the upper ends of the vertically elongated openings 20 formed in the upper ends of the hooks. This relative motion moves projection 25 (FIG. 4) into opening 24 to prevent disengagement of bill 21 from bar 4. In this manner the hooks 19 may not be retracted from the engaged position when the load of the container is carried by the lifting beam because of the interference between projections 25 and the portions of plate 29 adjacent openings 24.

A pair of horizontally spaced opposed vertical plates 30 are secured rigidly to the channel members 26, 27 at each end of the beam, and each pair of plates being positioned midway between the ends of said channel members. The plates of each pair are spaced apart longitudinally of the longitudinal axis of the beam.

A horizontal pivot 31 is carried by and extends between each pair of plates, and a vertically extending lever 32 is pivotally mounted on each pivot 31 at a point midway between its upper and lower ends. The near plate 30 in FIG. 4 is omitted to show the lever 32. The hooks 19 at each end of the beam are in substantially the same vertical plane as the levers 32, and a pair of connecting rods 33, 34 are provided at each end of the frame between the upper and lower channel members 26, 27. One rod 33 is pivotally connected at 35 with the upper end of the lever 32 and one end of the other rod 34 at the same end of the beam is pivotally connected with the lower end of the lever 32 as at 36. These rods 33, 34 extend oppositely outwardly of the lever and their outer ends are respectively pivotally connected at 37 with the projections 25 on the hooks 19 at each of the ends of the end frame members.

The upper end of each lever 32 may be extended at 39, and this extension is pivotally connected to the reciprocably actuated rod 40 of a hydraulic cylinder 41 for reciprocation of the rod 40 as desired; according to the flow of liquid from a source thereof connected with said cylinder in the conventional manner. Each cylinder is pivotally mounted at one end to the upper channel member 26. The same hydraulic system, insofar as fluid and controls therefor are concerned, as diagrammatically illustrated in FIG. 11 may be used (except that the cylinder and piston hydraulic mechanism is used instead of the rotary vane), including electrically actuated valves for regulating the flow of the liquid in the system from a remote point. FIG. 11 will be explained later on in detail, but there is nothing novel in the system itself.

The control of the hydraulic units is preferably from the cab of the operator of the crane that is adapted to be connected with the beam, and it will be seen that upon actuation of the rods 40 in one direction, the hooks 19 will be swung outwardly at their lower ends, while movement of the rods 40 in the opposite direction will result in moving the hooks inwardly or toward each other at their lower ends. Thus the movement of the hooks in both directions is positive, and being positive the hooks will all positively move to positions below bars 4 for engaging the latter when the beam is lifted, and will be positively withdrawn from said bars when the load is to be released.

The tapered lower ends of the hooks 19 will function to guide the hooks into positions within the socket members 3 when the beam is lowered. Each said hook is mounted for swinging between a pair of opposed cheek plates 42 (FIGS. 4, 5) which are secured to the bottom plate 29 of the lifting beam. The side edges of plates 42 are tapered convergently downwardly, generally in continuation of the edges 22, 23 of the associated hook 19, when the latter is in the retracted position (indicated in dot-dash line in FIG. 4), but plates 42 terminate short of the bill 21 of the hook. When hook 19 is in the retracted position plates 42 shield the bill 21 thereof against becoming accidentally engaged with an associated bar 4. It will be noted that hooks 19 swing outwardly away from plates 42 (FIG. 10) to expose bills 21 when it is intended that they should engage bars 4.

Each cheek plate 42 may be braced by a plate element 43 (FIG. 5) on the side opposite hook 19 and secured by welding to bottom plate 29 and plate 42. The oppositely outwardly facing sides of each pair of wedge elements 43 may extend slantingly upwardly at approximately the same angle as the angle of inclination of walls 5 of each corner member. When the beam is lowered over a container, the inclined outwardly facing sides of the elements 43 and plates 42 may assist in guiding the hooks into the socket members by engaging the upwardly inclined surfaces of walls 5 when the hooks have reached their proper positions in the socket members for actuation thereof to position the bills 21 below bars 4. It will be understood, however, that hooks 19 are primarily responsible for guiding themselves into the proper location to be engaged with the container socket members.

From the foregoing description it is seen that the means for actuating the hooks, including all portions of the latter except the downwardly projecting ends thereof, are between the channels 26, 27 at the opposite ends of the frame. It is also evident that all means adjacent to the hooks, such as plates 42 and elements 43, will move into the one large opening in the upper end of each socket member.

In addition to the hooks themselves the beam is provided with guide members generally designated 45 that extend downwardly across the oppositely outwardly facing sides of the pair of side frame members and end frame members to substantial distances below said members (FIGS. 1, 2). These guide members are vertically elongated and are curved laterally outwardly relative to the beam at their lower end portions. When the beam is lowered onto a container, there can be quite a wide error in the registration of the beam with the upper side of the container, but as long as this variation is within the rectangular area within the confines of lines extending through the lower ends of the guide members 45, the beam will automatically be guided into proper position over the container as the beam is lowered onto the latter.

Each of these guide members has a pair of substantially right angle extensions 46 (FIG. 9) rigid therewith extending over the upper sides of the side and end frame members.

A pair of corresponding horizontal shafts 47 are positioned over the upper sides of the side frame members 11 longitudinally thereof, and a pair of shorter shafts 48 are positioned over the end frame members 12, and extend longitudinally of the latter. Suitable bearings 50 secure said shafts 47, 48 to the frame members and support them for rotation about their respective axes.

The extensions 46 on one pair of said guide members 45 are rotatable on each of the shafts 47, 48 in spaced relation on said shafts whereby a pair of said guide members will be along adjacent frame members of the beam adjacent to the corners thereof.

Centrally between the ends of each of the shafts 47, 48 is a conventional torque actuator 51 through which each shaft rotatably extends. FIG. 11 diagrammatically illustrates the arrangement employed for each shaft. The housing of each actuator consists of a cylindrical chamber containing a stationary radially inwardly projecting barrier or shoe 52 and a radially outwardly projecting vane 53 is secured on each shaft 47, 48. FIG. 11 shows shaft 48 but the description applied to it is the same for all shafts.

Fluid pressure is applied to either side of vane 53 through either of the fluid lines 54, 55 which may extend to a source of supply 56. A constantly motor driven pump 57 may be in either of the lines 54 or 55 and a conventional solenoid actuated reversing valve 59 of any suitable type is actuatable to reverse the flow of fluid in lines 54, 55 upon actuation of switch 60 in the electrical lines leading to the solenoid of valve 59, so that the shaft 48 may be rotated in one direction or the other. Obviously the motor for the pump may be in the electrical system, if desired, for actuation upon actuating the solenoid valve. Other modifications are possible, but in whatever system is employed, it is preferable that the shafts 47, 48 be positively driven and that they be actuatable independently of each other from a remote point, such as from the cab of the crane, since there are circumstances in which only certain of the guide members are elevated, while at other times all of them or none of them need be actuated.

This rotation of the shafts will cause the guide members on the shaft being rotated to swing to elevated positions 58 (FIG. 8) over the frame member carrying the shaft, in which elevated positions the guide members so moved will be disposed wholly within the upwardly projecting confines of the lifting beam. As will later appear, the connection between each shaft and the guide members thereon is associated with a locking means for positively holding the guide members in downwardly projecting operative positions until the shafts carrying them are rotated.

FIG. 7 shows one of the guide members 45 at one side of a side frame member, and in this view is shown a locking means for positively, but releasably, locking the guide elements in downwardly projecting positions. As already stated, the end frame members are each shown as a pair of vertically spaced channel members having their open sides directed toward each other. The locking units for the guide members along the end frame members are exactly the same as those along the side frame members, except that the upper and lower bolt holes 62, 63 (FIG. 7) in the upper and lower flanges of I beams that form the side frame members are formed in the horizontal webs of the upper and lower channel members of the end frame members. The numbers will refer to the openings only, whether in the I beams or channel members.

Referring to FIG. 7 the locking means for each of the guide members 45 comprises a vertical bolt 64 that extends through openings 62, 63 at its upper and lower ends and which bolt projects at its upper and lower ends above and below the end or side frame members according to which it is on. Conventional "Oilite" bushings secured in said openings slidably support each locking bolt.

An upper collar 66 is secured on each bolt to limit its upward movement, and a helical spring 67 reaches between the lower wall of the side or end frame members, as the case may be, and a collar 68 secured on each locking bolt for yieldably urging each bolt upwardly when each bolt is free to move upwardly.

A laterally projecting element 69 is rigid with each guide member and is positioned to project below the lower surface of the end or side frame member that carries the guide element, and this ear is apertured for receiving the downwardly projecting lower end of each bolt 64 when the bolt is in a depressed position with the spring 67 under compression, and when the guide member is in its operative, downwardly extending position, as seen in FIG. 7.

The means for holding the bolt down in locking relation to the guide member is a cam lug 71 (FIGS. 6 to 9) projecting radially of an annular collar 72 secured on shaft 47 or 48 between the pair of extensions 46 on each guide member. This lug extends over the upper end of bolt 64 to hold the bolt down when the shaft carrying the guide member is in a position with the guide member in operative downwardly projecting position. Ears 73 (FIG. 9) formed on said collar 72 project axially of the latter into recesses 74 formed in the radially outwardly facing sides of the extensions 46 at opposite sides thereof.

Upon rotating the shaft 48, seen in FIG. 7, for example, in a clockwise direction to swing the guide member 45 clockwise to position 56 seen in FIG. 8, the first action will be for the ears 73 (FIG. 9) to move clockwise to release the locking bolt 64 so the member 45 will be free to swing, and continued rotation of the shaft will effect engagement of ears 73 with the end of recesses 74 so as to positively drive the guide members to position 56.

To swing the guide members back to operative position, a reverse rotation of shaft 48 will cause the ears 73 on collar 72 to positively drive the extensions 46 on guide member 45 counterclockwise as seen in FIGS. 7, 9 and at the end of this rotary movement the bolt 64 will be depressed to project through the aperture in the lateral element 69 and the guide members will then be positively locked in downwardly extending position, the above operation is the same for each of the guide members and locking means.

Other cross frame members 76 (FIG. 1) are in pairs and extend between the side frame members at points adjacent to and equally spaced from the end frame members of the beam. Each pair of these cross frame members may carry hoisting sheaves 77 to which conventional hoisting cables, indicated in dash lines 78 (FIG. 2), may be connected for hoisting the lifting beam.

Secured to the lower surfaces of the side and end frame members at each of the guide members is a relatively thick rubber pad 80 (FIGS. 6–8) that is adapted to absorb the shock that may occur in the operation of positioning the lifting beam on a container. It is to be noted that each lifting beam is adapted to lift a load in excess of twenty-five tons, hence the accurate and safe manipulating of such a load is a problem that is not the same as in handling small conventional loads where no registration between the lifting beam and container is essential.

In operation, assuming a container on a trailer is to be removed therefrom and stored on a deck or platform, the operator will position the beam substantially over the container and will lower it on the latter. The guide members 45 will cause the beam to swing one way or the other until it is sufficiently in registration with the container so that the hooks will enter the relatively large upper open ends of the corner castings or socket members, when further lowering of the beam will result in the latter being deposited on the container with the hooks in the position shown in FIG. 4. The rubber pads carried by the beam on its underside will cushion the beam.

The operator will then effect positive engagement of the hooks with the bars 4 by causing actuation of the hydraulically actuated lever 32 to swing the hooks oppositely outwardly relative to the longitudinal axis of the beam to positions below the bars 4, and upon subsequent actuation of the hoist or crane the beam will be lifted together with the container securely coupled thereto.

In the event the container is to be deposited in a location where there can be no interference with a wall, or other container, the guide members 45 may remain locked to the beam in depending position, as seen in FIG. 7. However, should it be desirable that the container be positioned in a close space from which another similar container has been removed, it is merely necessary to effect actuation of all of the rotary actuators 51 to cause the guide members to swing to positions over the container, and the container may be readily lowered into the desired space. This circumstance may exist anywhere, and need not be one that is specifically caused by the removal of one container from others.

Also there are instances in which it may be desirable to deposit a container next to another one, or next to a wall or in a corner, and in such instances the guide members 45 that would interfere with such an operation are merely swung to position 58 (FIG. 8) over the beam.

The reverse condition may occur in which the guide members might interfere with the removal of a container from a close space, and in such instances the guide members that would interfere with such an operation are caused to swing to positions 58 (FIG. 8).

From the foregoing it is apparent that the beam may be guided to coupling relation with a container without using the guide members 45, but inasmuch as the rapidity with which the beam may be coupled with a container is very important, and inasmuch as most operations can be performed without interference from the guide members when they are in depending positions, their use is quite important in reducing the time of a coupling operation to the minimum.

We claim:

1. A lifting beam for engagement with a rectangular container of the type having four upper corners and an upwardly opening socket member at each of said corners that includes a bar adapted to be engaged by a hook on such beam for lifting and carrying said container, said beam comprising:
    (a) a rectangular frame having spaced, parallel side frame members in side by side relation and
    (b) parallel end frame members connecting corresponding ends of said side frame members,
    (c) means on said beam for connecting it with a hoisting mechanism,
    (d) four hooks depending from the lowermost side of said frame,
    (e) pivots respectively supporting said hooks on said frame for entering each of said socket members upon lowering said frame over said container and for swinging said hooks about horizontal axes into engagement with said bars when said hooks are in said socket members;
    (f) power actuatable means connected with said hooks for simultaneously swinging them about said horizontal axes into and out of said engagement with such bars,
    (g) said hooks being movable vertically relative to said horizontal axes from predetermined lowered positions to predetermined elevated positions above said lowered positions and vice versa,
    (h) yieldable means connected with said hooks for yieldably urging them to said elevated positions and for permitting downward movement of said hooks to said lowered positions, against the resistance of said yieldable means, under the weight of such container when said beam is lifted by such hoisting mechanism,
    (i) means respectively rigid on said frame and on said hooks in positions for positively obstructing swinging of said hooks about their said axes out of lifting engagement with said bars when said hooks are in said lowered positions in lifting relation to said bars.

2. A lifting beam for carrying a horizontally disposed rectangular freight container having a top and four lateral sides, comprising:
    (a) a horizontal rectangular frame of substantially the same size as the outline of the top of said container,
    (b) means on said frame for connecting it with a hoisting mechanism,
    (c) a plurality of guide means on said frame depending therefrom adapted to engage said container and to extend partially over said sides of the latter for guiding said frame to a position in registration with said top of said container upon lowering said frame to said container,
    (d) means on said frame engageable with such container for coupling the frame to said container,
    (e) means mounting said guide means on said frame for movement of said guide means out of engaging relation with said container and away from the latter to positions above said lateral sides of said container to enable releasing such container from said lifting beam when such container is deposited by said lifting beam in a position substantially in side by side engagement with a similar container free from interference from said guide means,
    (f) means respectively on said guide means and on said frame releasably locking said guide means in depending relation to said frame,
    (g) power means connected with said guide means for so moving the latter,
    (h) lock releasing means connected with said power means for actuation thereby to free said locking means for movement thereof to release said guide means, and
    (i) yieldable means connected with said locking means for moving the latter out of locking relation whereby said guide means will be free for said movement to positions above said lateral sides of said container.

3. In combination with a rectangular freight container having four vertical corner posts at the four corners thereof and upwardly opening socket members integral with said posts at their upper ends,
    (a) each of said socket members including a horizontal bar defining one side of the upwardly directed socket opening therein,
    (b) a pair of walls integral with each of said members extending slantingly downward and convergently from opposite ends of said bar at one side thereof and spaced apart at their lower ends to define two of the sides of said upwardly directed socket opening adjacent to said bar, (c) a rectangular horizontally disposed lifting beam having four hooks thereon depending from the corners thereof in positions adapted to enter said upwardly directed socket openings upon lowering said beam toward and substantially to said container, (d) the space between the lower ends of each pair of said walls being adapted to relatively loosely receive one of said hooks therein, (e) a pair of elements rigid with said beam projecting downwardly therefrom at two opposite sides of each of said hooks and closely adjacent to the latter, (f) each pair of said elements having generally downwardly and laterally outwardly directed inclined lower surfaces facing away from the hook therebetween, which surfaces are substantially complementary to the inclined upper surfaces of said two of the sides of each socket opening and are engageable with said last mentioned surfaces for holding the lower ends of said hooks centered in the space between the lower ends of each of said pair of walls in each socket members at a level below each of said bars, (g) means supporting said hooks on said beam for swinging of the latter into and out of engaging relation to said bars, (h) means on said beam connected with said hooks for simultaneously swinging said hooks into and out of engaging relation to said bars when said hooks are within said socket openings and their lower ends are in the spaces between the pairs of walls in said socket members, respectively.

4. In combination with a rectangular freight container having four vertical corner posts at the four corners thereof and upwardly opening socket members integral with said posts at their upper ends, (a) each of said socket members including a horizontal bar defining one side of the upwardly directed socket opening therein, (b) a pair of walls integral with each of said members extending slantingly downwardly and convergently from opposite ends of said bar at one side thereof and spaced apart at their lower ends to define two of the sides of said upwardly directed socket opening adjacent to said bar, (c) a rectangular horizontally disposed lifting beam having four hooks thereon depending from the corners thereof in positions adapted to enter said upwardly directed socket openings upon lowering said beam toward and substantially to said container, (d) the space between the lower ends of each pair of said walls being adapted to relatively loosely receive one of said hooks therein, (e) a pair of elements rigid with said beam projecting downwardly therefrom at two opposite sides of each of said hooks and closely adjacent to the latter, (f) means mounting said hooks on said lifting beam for limited vertical movement relative thereto and to said elements and for swinging their lower ends laterally into and out of engagement with said bars when said hooks are within said socket openings and their lower ends are in the spaces between the pairs of walls in said socket members respectively, (g) means on said beam connected with said hooks for simultaneously swinging said hooks into and out of engaging relation to said bars;

(h) means for limiting said vertical movement of said hooks to between an upper position and a lower position, (i) a spring connected with each hook and with said beam for yieldably holding each hook in said upper position thereby permitting movement of each hook to said lower position against the resistance of each spring upon said beam being lifted when said hooks are in engagement with said bars, and (j) means respectively on said beam and hooks in positions obstructing said hooks against their swinging out of engagement with said bars when said hooks are in their lower positions to thereby prevent withdrawal of said hooks from said bars when a container is being lifted by said beam, (k) said hooks being free from obstruction to said swinging thereof when said hooks are in their said upper positions.

5. In the combination as defined in claim 3:

(i) guide means on said beam at opposite sides of each of the corners thereof and adjacent to but spaced from each of said four corners, (j) said guide means being vertically elongated members extending vertically downwardly from said beam at their upper end portions and then laterally outwardly and downwardly at their lower end portions relative to said beam and terminating at their lower ends at a level substantially below said hooks and said elements, (k) the said lower end portions of said guide means being adapted to engage said container for guiding said beam to a position in which the said upper end portions of said guide members engage the sides of said container with said hooks aligned over said socket members for entering the latter when said beam is lowered onto said container.

6. In combination with a rectangular horizontally disposed freight container having four vertical corner posts at the four corners thereof and (a) socket members at the upper ends of said posts integrally connected to the latter each having an upwardly directed socket opening formed therein, (b) each of said members including a horizontal bar integral therewith defining one side of the upwardly directed socket opening, (c) a rectangular horizontally disposed lifting beam having four hooks depending from the four corners thereof adapted to enter said upwardly directed openings and to move downwardly at their lower ends past said bars in said socket members upon lowering said beam to said container, (d) each of said hooks having a laterally projecting bill at its lower end providing an upwardly directed bar-engaging surface on each bill adapted to engage the underside of one of said bars, (e) pivot means pivotally supporting said hooks at their upper ends spaced above said bills on said beam in positions with said bills projecting to the sides of said hooks at which said bars are positioned when said beam is lowered for downward movement of said lower ends of said hooks into said upwardly directed socket openings and past said bars, (f) said pivot means supporting said hooks for lateral swinging of said bills from retracted positions at one side of said bars to bar engaging positions below said bars when said lower ends of said hooks are in said socket members and said lower ends of said hooks have moved past said bars, (g) means on said beam connected with said hooks for so swinging the latter, and (h) means on said beam positioned closely adjacent one side of each bill extending to the outer end of the latter shielding each said bill against accidental movement thereof below said bars when said bills are in said retracted positions in the event of bodily lateral movement of said beam and hooks as a unit in a direction for moving certain of said bills below certain of said bars.

7. In a cargo handling system, in combination:
(a) a rectangular freight container having a rectangular upper side and four socket members at its upper four corners having upwardly directed socket openings formed therein;
(b) each socket member having a horizontal bar therein defining one side of each socket opening and
(c) a pair of elements defining two of the sides normal to opposite ends of each of said bars and
(d) a wall defining the side of each socket opening opposite to said bar;
(e) said elements, bar and wall, being integral with each socket member,
(f) a rectangular, horizontally disposed lifting beam adapted to register with the rectangular upper side of each container,
(g) said lifting beam having four hooks depending from its four corners and bills projecting laterally from the lower ends of said hooks,
(h) pivot means pivotally supporting said hooks on said beam at their upper ends above said bills in said depending relation to said beam and in positions aligned over said upwardly directed openings in said socket members when said beam is in registration with said upper side of said container,
(i) said pivot means supporting said hooks with their said bills directed toward said bars for engagement of said bills below said bars upon swinging said hooks toward the latter when said beam is lowered and said bills are in said socket members,
(j) means on said beam connected with said hooks for swinging said hooks from retracted positions in which said bills are offset to one of the sides of said bars to bar engaging positions in which said bills are below said bars and vice versa,
(k) rigid means rigid with and depending from said beam at opposite sides of each of said hooks adapted to enter each of said upwardly directed socket openings together with the hook between said rigid means and to engage said pair of elements in each socket member for limiting downward movement of the bill of each hook to a position in which said bill will clear the bar adjacent thereto for movement thereunder to said bar engaging position.

8. In a construction as defined in claim 7,
(l) said rigid means comprising a pair of spaced, opposed cheek plates between which each of said hooks is adapted to swing for movement of each of said bills from said retracted position to said bar engaging position,
(m) said cheek plates extending across the sides of the bill on each hook when the latter is in its said retracted position for preventing accidental engagement of each bar by the bill adjacent thereto.

9. In a construction as defined in claim 8,
(n) each of said cheek plates being adapted to engage said bar and the edge of said upwardly directed socket opening opposite thereto for holding said beam against horizontal bodily movement laterally in the direction of the swinging movement of said hook when said cheek plates are in engagement with the said elements in each socket member.

10. In a construction as defined in claim 9,
(o) said cheek plates terminating at their lower ends at a level above the lower ends of said hooks and said elements terminating at their lower ends above the lower ends of said hooks and below the lower ends of said cheek plates,
(p) each pair of said cheek plates having convergently downwardly inclined generally laterally facing surfaces facing away from the hook between each such pair adapted to engage the generally laterally upwardly facing side surfaces of said pair of elements in each socket member for guiding said hook toward a central position in each socket member.

11. A lifting beam for carrying a horizontally disposed rectangular freight container having a top and four lateral sides comprising:
(a) a horizontal rectangular frame of substantially the same size as the outline of the top of said container,
(b) means on said frame for connecting it with a hoisting mechanism,
(c) a plurality of guide means on said frame depending therefrom adapted to engage said container and to extend partially over the outwardly facing surfaces of said four lateral sides of said container for guiding said frame to a position in registration with the top of said container upon lowering said frame to said container,
(d) means on said frame for coupling said frame to said container when said frame is lowered to said container and is in said registration with the top of said container;
(e) means supporting said guide means on said frame for movement of the guide means adapted to engage each of the lateral sides of said container from container engaging positions engaging said four lateral sides of said container to elevated positions out of engagement with said container and above the latter while said frame is substantially against the top of said container and coupled thereto whereby said container may be positioned in side by side relation with a similar container free from interference from said guide means,
(f) means on said frame connected with said guide means for so moving the latter,
(g) said guide means comprising vertically elongated elements extending downwardly and outwardly relative to said frame from each of the four sides thereof;
(h) said means supporting said guide means comprising horizontal shafts rotatably secured on said frame adjacent to said sides thereof and connected with the upper ends of said elements for revolving said elements about the axes of said shafts respectively when said shafts are rotated, and
(i) power means respectively connected with said shafts for selectively rotating them whereby the lower ends of said elements may be selectively revolved upwardly about the axes of said shafts to positions above the latter.

References Cited in the file of this patent

UNITED STATES PATENTS

| | | |
|---|---|---|
| 1,050,578 | Tucker | Jan. 14, 1913 |
| 2,047,139 | Fildes | July 7, 1936 |
| 2,047,140 | Fildes | July 7, 1936 |
| 2,212,064 | Elliot | Aug. 20, 1940 |
| 2,457,841 | Smith et al. | Jan. 4, 1949 |
| 2,547,502 | Smith et al. | Apr. 3, 1951 |
| 2,613,836 | Newhall et al. | Oct. 14, 1952 |
| 2,847,245 | Leslie | Aug. 12, 1958 |
| 2,904,370 | Meinholtz et al. | Sept. 15, 1959 |

OTHER REFERENCES

Schmidt: German application 1,001,473, printed Jan. 24, 1957 KL. 35b 6/25.